United States Patent
Vargas et al.

(10) Patent No.: US 7,009,108 B2
(45) Date of Patent: Mar. 7, 2006

(54) DEVICE BRACKET FOR METAL RACEWAY AND COVER PLATES FOR USE THEREWITH

(75) Inventors: Antonio J. Vargas, Burlington, CT (US); Joseph A. Milheiro, West Hartford, CT (US); Jeffrey Hemingway, Farmington, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 10/784,475

(22) Filed: Feb. 23, 2004

(65) Prior Publication Data

US 2005/0183874 A1    Aug. 25, 2005

(51) Int. Cl.
*H02G 3/04*    (2006.01)
(52) U.S. Cl. .......................... 174/48; 174/53; 174/68.3; 220/3.3; 439/207
(58) Field of Classification Search ................ 174/48, 174/49, 68.1, 68.3, 60, 65 R, 72 R, 72 C, 174/88 R, 95, 96, 97, 99 R, 101, 50; 248/68.1, 248/49, 74.4; 439/207, 209, 211, 216, 212, 439/658; 220/3.2, 3.3, 3.8, 3.9; 52/220.1, 52/220.3, 220.5, 220.7
See application file for complete search history.

(56) References Cited

U.S. PATENT DOCUMENTS

| | | | | |
|---|---|---|---|---|
| 4,017,137 A | * | 4/1977 | Parks | 174/48 |
| 4,723,580 A | * | 2/1988 | Trautwein | 174/68.3 |
| 4,952,163 A | * | 8/1990 | Dola et al. | 174/48 |
| 5,086,194 A | * | 2/1992 | Bruinsma | 174/48 |
| 5,732,747 A | * | 3/1998 | Holliday | 174/48 |
| 5,879,185 A | * | 3/1999 | Handler et al. | 439/538 |
| 6,150,610 A | * | 11/2000 | Sutton | 174/68.3 |
| 6,211,460 B1 | * | 4/2001 | Hull et al. | 174/48 |
| 6,323,421 B1 | * | 11/2001 | Pawson et al. | 174/68.1 |
| 6,344,611 B1 | * | 2/2002 | Ewer et al. | 174/48 |
| 6,350,135 B1 | * | 2/2002 | Acklin et al. | 174/48 |
| 6,362,420 B1 | * | 3/2002 | Bacouelle et al. | 174/48 |
| 6,380,486 B1 | * | 4/2002 | Hemingway et al. | 174/68.1 |
| 6,563,046 B1 | * | 5/2003 | Jarry et al. | 174/50 |
| 6,664,467 B1 | * | 12/2003 | de la Borbolla | 174/48 |

* cited by examiner

*Primary Examiner*—Angel R. Estrada
(74) *Attorney, Agent, or Firm*—McCormick, Paulding & Huber LLP

(57) ABSTRACT

In a two piece metal raceway having snap-in cover segments that engage marginal edges of the base, a gap between adjacent cover segments is fitted with a stamped device bracket including rearwardly bent end portions with angled tap and bottom edges that are snapped into the base. This device bracket lies in the same plane as the cover segments so a cover plate can overlap these raceway cover segments. The resulting assembly lends itself to considerable time savings for the installer.

5 Claims, 4 Drawing Sheets

DEVICE BRACKET FOR METAL RACEWAY AND COVER PLATES FOR USE THEREWITH

BACKGROUND OF THE INVENTION

This invention relates generally to metal raceways of the type having a base and a cover, and defining at least one, and preferably two side-by-side wireways for accommodating power cables and data/communication wiring. More particularly, this invention relates to a device bracket and associated cover plate for accommodating at least one duplex outlet or for accommodating side-by-side duplex outlets in such a two piece metal raceway. The raceway is generally of the type marketed by Wiremold under the 3000, 4000 and 6000 model raceway configurations. Installing duplex outlets in such raceway spaced sheet metal clips must be provided at precise spacing to accommodate conventional duplex outlet plugs, and the cover plate is of conventional configuration being secured to these outlet plugs in a conventional manner.

The prior art also shows several raised outlet plugs supporting device brackets or fittings in order to minimize the reduction and cross sectional area of the associated raceways provided behind these assemblies. However, such prior art devices have generally been unsatisfactory in that they protrude excessively from the raceway cover, and because the raceway cover are generally crudely cut so as to be installed in a manner that provides a less than satisfactory appearance in the resulting assembly.

SUMMARY OF THE INVENTION

The present invention seeks to avoid these limitations of the prior art and the present invention provides in the environment of the two piece metal raceway an improvement whereby the metal device bracket is of one piece configuration and is nevertheless stamped from a single piece of sheet metal so as to be received in the raceway base and to provide a support for at least one electrical device. The device bracket more particularly defines at least one opening for receiving the electrical device, and includes inwardly bent end portions which are spaced a predetermined distance from one another and which are adapted to abut the spaced raceway cover segments. The device bracket end portions include angled outer edges of the same thickness as the stamped steel device bracket itself in these edge portions include relieve portions that compliment the elongated marginal edges of the raceway base to support the device bracket in the base and to in turn provide support for at least one electrical device.

The front face of the device bracket is oriented in substantially the same plane as that of the flat cover segments which abut it, and the cover plate used with the device bracket for enclosing the outlet device overlays the raceway cover segment end portions to hide the gap common to prior art installations in such raceway configurations.

While the general concept of providing a cover plate in overlapping relationship to adjacent raceway cover segments is known, as for example in pending U.S. application Ser. No. 10/200,070, filed Jul. 19, 2002, entitled, "Raceway System with Selectively Placed Outlet Devices, this feature has not be adapted for use in providing for metal device brackets in metal raceways generally. Thus, the present invention achieves a less obtrusive installation for outlet devices, such as outlet plugs, in "two-piece" metal raceways having a base and cover.

DESCRIPTION OF A PREFERRED EMBODIMENT

Two piece metal raceways of the type sold by Wiremold under the 4000 and 6000 series are mounted as baseboard along a wall, or across a structure (not shown) such as a wall. A short segment of such a raceway is illustrated in FIG. 1, and in FIG. 2, as comprising a raceway base 10 which is formed into a U-shape from a metal such as steel, and includes elongated inturned marginal edges 10a and 10b that are designed to receive raceway covers such as those illustrated at 12a and 12b.

The raceway base 10 further includes a divider 14 adapted to be held in place by metal clips (not shown) that are such as described in U.S. Pat. No. 6,380,486 or of an older style such as those that preceding the divider clip arrangement disclosed in said U.S. Pat. No. 6,380,486.

Figure 1:
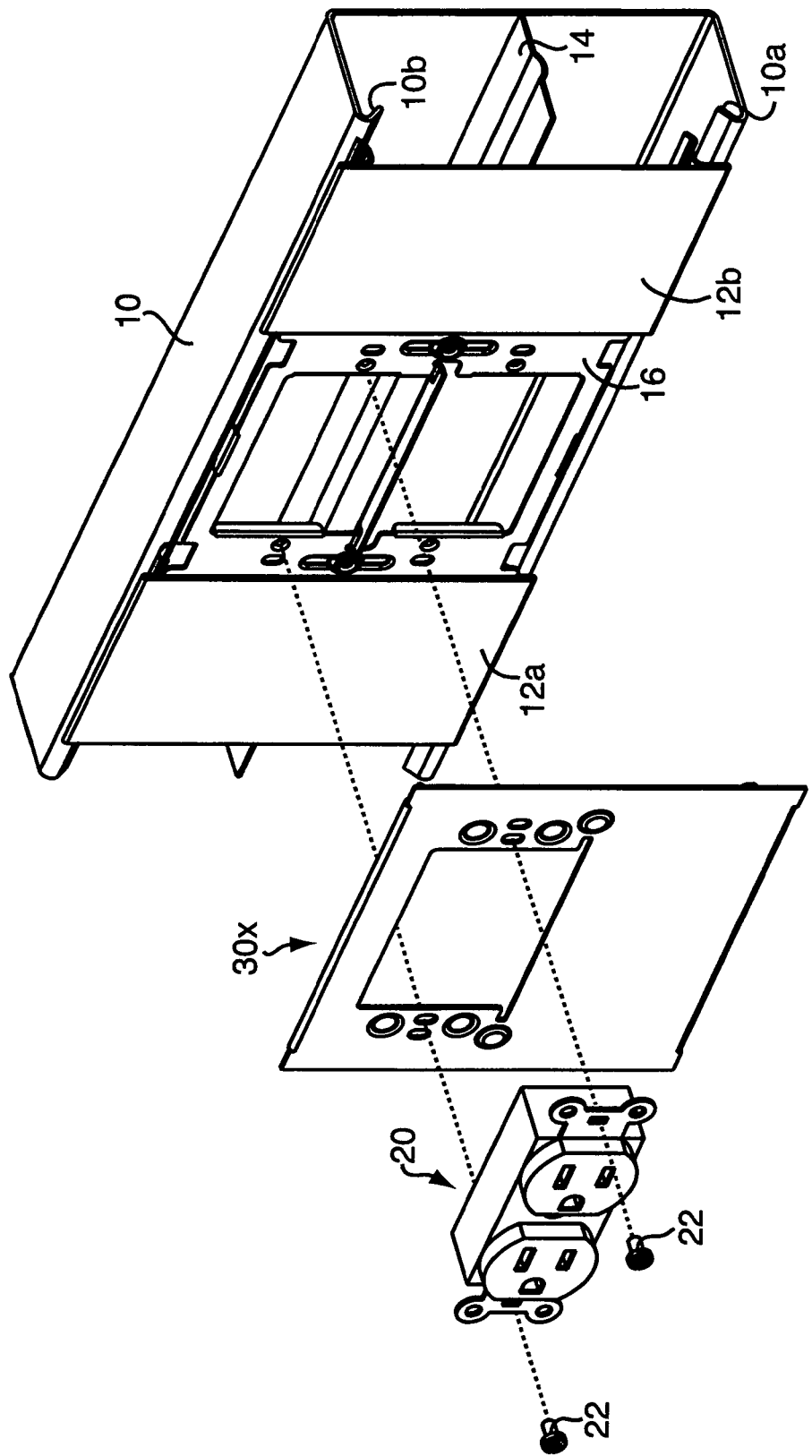
FIG. 1 is an exploded view illustrating a two piece metal raceway with a device bracket of the present invention installed in abutting relationship with raceway cover segments, and a cover plate and outlet device in exploded relationship relative thereto.
Figure 2:
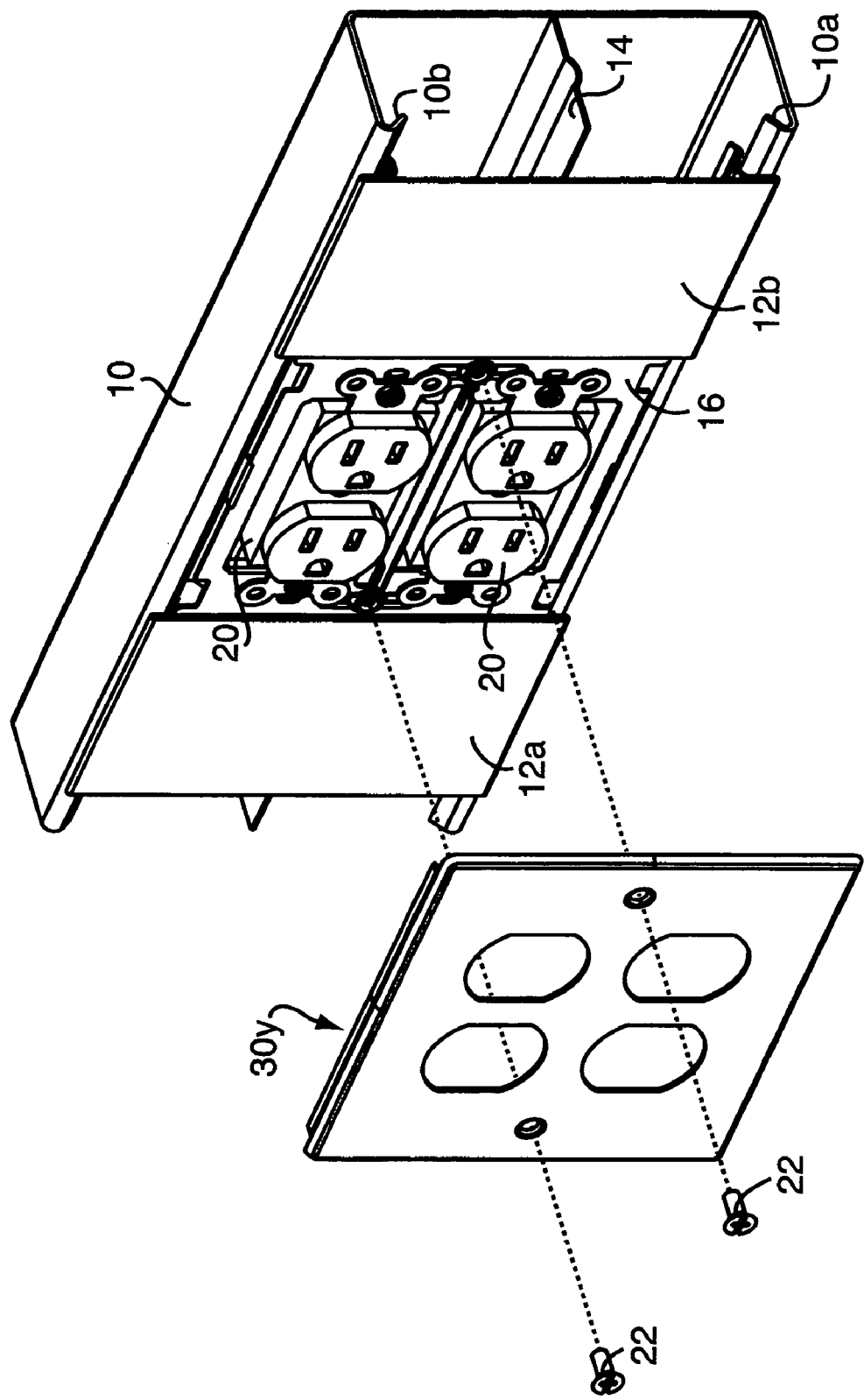
FIG. 2 shows an alternative configuration for the raceway assembly of FIG. 1 wherein side-by-side outlet devices are unobtrusively provided in a two piece metal raceway of the type shown in FIG. 1, and again with the cover plate provided in exploded relationship relative thereto.

Thus, and as shown in FIGS. 1 and 2, the raceway base 10 defines side-by-side wireways of generally equal cross sectional area. FIG. 1 illustrates an installation such as might be used to carry power lines in the top raceway and data/communication wireways in the bottom raceway. FIG. 2 on the other hand shows a raceway configuration adapted to carry power cables in both the top and bottom wireways. It is noted that the same device plate 16 can be utilized either in the FIG. 1 or the FIG. 2 configuration.

Figure 3:
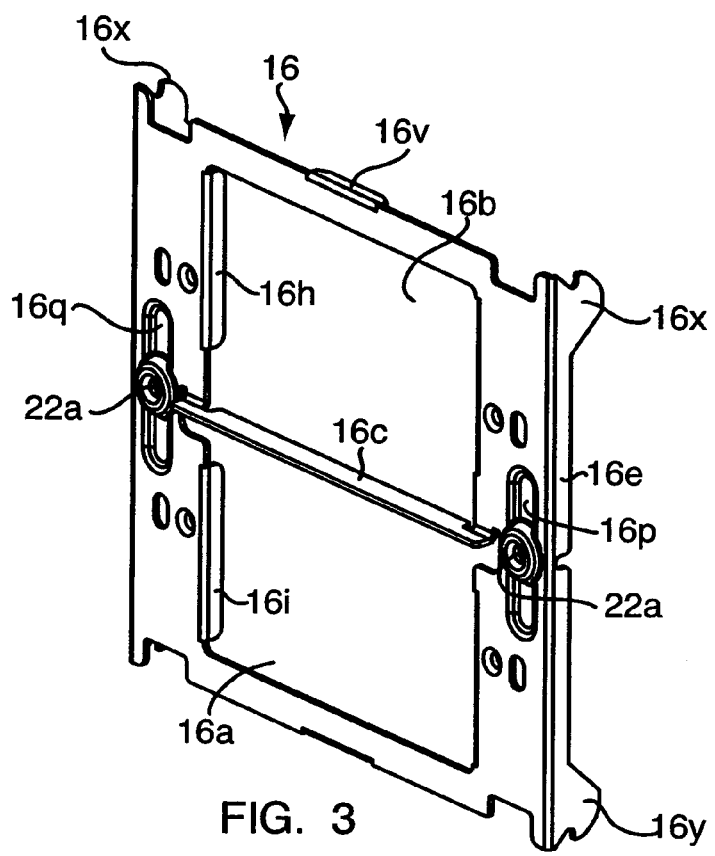
FIG. 3 shows the device bracket in perspective for the installations of FIGS. 1 and 2.
Figure 4:
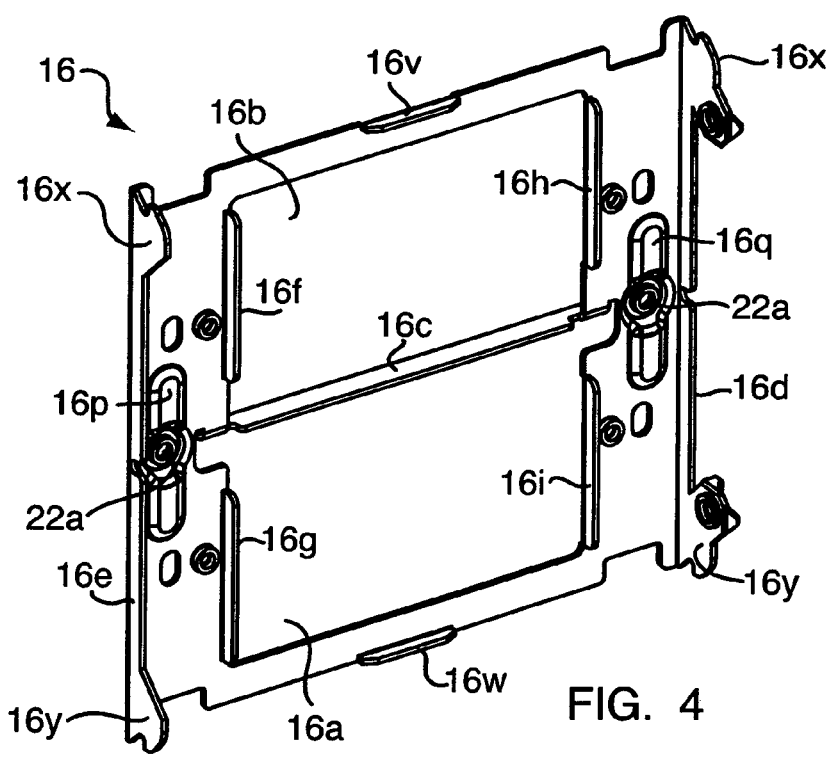
FIG. 4 shows the device bracket of FIG. 3 also in perspective but in a rear quartering view.

Turing next to a more detailed description of the bracket/device that supports the outlet device, FIG. 3 shows the preferred form for such a device plate 16 from both the front and the rear as conveniently fabricated from a flat sheet metal blank, to include top and bottom openings 16a and 16b separated by an integrally formed bar 16c which is twisted 90° in the stamping process to form a continuation of the divider 14 in the raceway base to isolate the outlet devices provided in each of these wireways. More particularly, the openings 16a and 16b associated with the separated wireways, are adapted to receive outlet devices 20,20 as best shown in FIG. 2.

The device bracket 16 further includes rearwardly bent flanges 16d and 16e, which flanges are spaced apart longitudinally relative to the raceway so as to accommodate standard duplex outlet devices such as those illustrated in FIGS. 1 and 2 at 20. These conventional outlet plugs are provided with screws, or other fasteners, to be received in openings provided for this purpose in the device plate, as indicated generally at 22a. More particularly, these openings 22a are provided in generally coplanar relationship with the plane defined by the cover segments 12a and 12b. The spaced end portions of the cover segments 12a and 12b are adapted to abut the rearwardly bent flanges 16d and 16e of the device bracket 16.

Again, with reference to the device bracket 16, each of the openings 16a and 16b is further defined by these rearwardly turned flanges 16f through 16j in order to provide an added degree of rigidity to the device bracket itself, and to electrically isolate the outlet devices from the cables or wires in their associated wireways.

It is an important feature of the present invention that the rearwardly bent 90° flanges 16d and 16e are formed with upper and lower J-shaped abutments 16x and 16y that are so shaped as to be received by, and to resiliently deform the base sidewalls to accept these J-shaped abutment end portions.

In addition to the stiffeners, 16f through 16j respectively provided at the end portions of the openings 16a and 16b, additional stiffeners 16v and 16w are also provided, as are dimpled portions 16p and 16q, that serve to give the sheet metal stamped device bracket greater rigidity.

In summary, the device bracket described above provides a relatively compact mounting unit for one or more outlet devices, and preferably two tandem outlet plugs, or in a stretched version might also comprise a device bracket suitable for holding up to four such outlet plugs. The device bracket replaces the individual clips formerly required, and avoids the need for the installer to accurately space such clips in order to install the outlet devices as described. Further, and the device bracket is designed to abut the end portions of adjacent cover segments, and is designed to be conveniently and inexpensively manufactured from a sheet metal blank. A divider bar or center bar 16c is aligned with the divider 14 in the raceway base to electrical isolate the wireways from one another so that the power connectors to one outlet plugs will not create a hazard in the adjacent plug.

Figure 5:
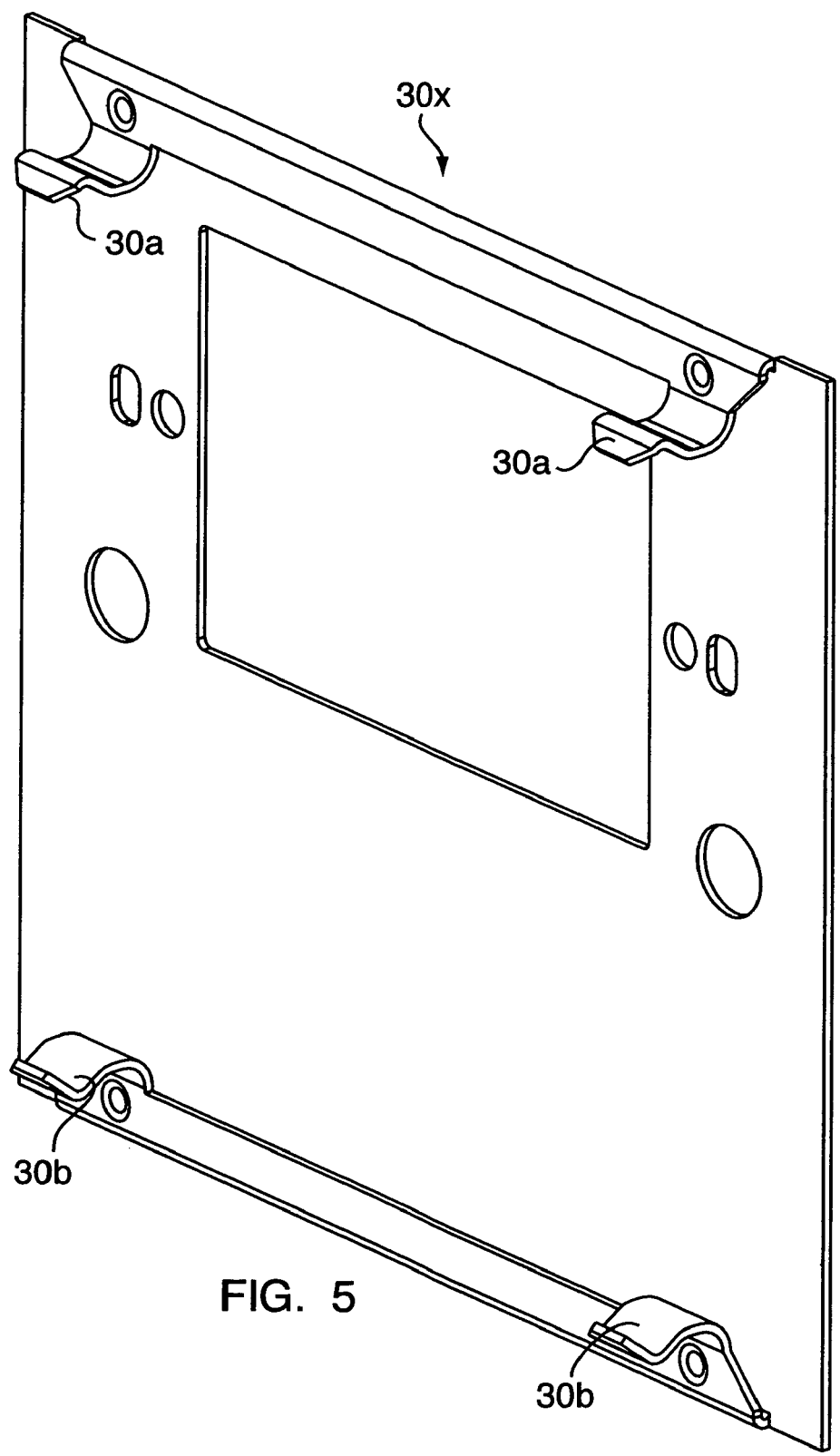
FIG. 5 shows the cover plate of FIG. 1 from the rear to illustrate the manner of mounting same to the raceway base.

In conclusion, a cover plate 30x or 30y is provided over the installed outlet plug, or plugs in the device bracket as suggested in FIGS. 1 and 2. The cover plate 30y has conventional openings for receiving the outlet plug portions, and openings for receiving the screws 22,22. In accordance with the present invention the cover plate 30x and 30y preferably includes integrally formed rearwardly projecting tabs that are adapted to be received in slots defined for this purpose between the top and bottom marginal edges of the device bracket, and the in turned flanges of the raceway base 10. Since the device bracket is support solely by the J-shaped abutments 16x and 16y at each end of the device bracket itself, these slots afford convenient openings to receive rearwardly projecting tabs 30a and 30b on the cover plate 30x as best shown in FIG. 5.

In light of the above description it is therefore understood that within the scope of the appended claims the invention may be practiced otherwise than as specifically described.

What is claimed is:

1. In a two piece metal raceway assembly of the type having an elongated base formed into a C-shaped cross section defining an open side with parallel side walls having in turned flanges that are angled with respect to the generally parallel sidewalls of the C-shaped base, and elongated cover segments having longitudinally extending rearwardly projecting flanges for assembly with the base flanges so that the cover segments are of substantially the same width as the base, the improvement comprising a metal device bracket for placement between spaced raceway cover segments to provide support for at least one electrical device, said device bracket being formed from a flat steel blank having at least one opening for receiving said electrical device, said device bracket including rearwardly bent end portions for abutting the spaced raceway cover segments without being supported by the cover segments, said rearwardly bent end portions further including angled outer ends of J-shape to be received between the in turned flanges of the raceway base, whereby the device bracket can be assembled with the raceway base as a result of deforming the base sidewalls so as to receive said J-shaped end portions, and said device bracket having a generally flat portion intermediate said rearwardly bent flanges and lying in the same plane as defined by the adjacent spaced raceway cover segments.

2. The combination according to claim 1 wherein said at least one opening is formed at least in part by a bar defined by said device bracket and oriented generally perpendicular said rearwardly bent flanges of said device bracket.

3. The combination according to claim 2 wherein said device bracket further defines a second opening defined in part by said bar, and wherein said bar is provided midway between said in turned flanges or said raceway base so as to be aligned with a divider conventionally supported in said raceway base for defining separated wireways.

4. In a two piece metal raceway assembly of the type having an elongated base formed into a C-shaped cross section defining an open side with parallel side walls having inturned flanges that are angled with respect to the generally parallel side walls of the C-shaped base, and elongated cover segments having longitudinally extending rearwardly projecting flanges for assembly with the base flanges so that the cover segments are of substantially the same width as the base, the improvement comprising a metal device bracket for placement between spaced raceway cover segments to provide support for at least one electrical device, said device bracket being formed from a flat steel blank having at least one opening for receiving said electrical device, said device bracket including rearwardly bent end portions for abutting the spaced raceway cover segments, said rearwardly bent end portions further including angled outer ends of J-shape to be received between the inturned flanges of the raceway base, whereby the device bracket can be assembled with the raceway base as a result of deformning the base side walls so as to receive said J-shaped end portions, said at least one opening being formed at least in part by a divider bar. defined by the device bracket and oriented generally perpendicular to said rearwardly bent end portions, said device bracket further defining a second opening defined in part by said bar, said bar being provided midway between said in turned flanges of said raceway base so as to be aligned with a divider conventionally supported in said raceway base for defining separated wireways, and a cover plate having rearwardly projecting flanges receivable between said in turned flanges of said raceway base without interference with said device bracket, said divider bar having a width to be aligned with said divider in said raceway base so as to occupy a substantial portion of the space between the underside of said cover plate and a forward edge of said raceway base divider.

5. In a two piece metal raceway assembly of the type having an elongated base formed into a C-shaped aces section defining an open side with parallel side walls having inturned flanges that are angled with respect to the generally parallel side walls of the C-shaped base, and elongated cover segments having longitudinally extending rearwardly projecting flanges for assembly with the base flanges so that the cover segments are of substantially the same width as the base, the improvement comprising a metal device bracket for placement between spaced raceway cover segments to provide for at least one electrical device, said device bracket being formed from a flat steel blank having at least one opening for receiving said electrical device, said device bracket including rearwardly bent end portions for abutting the spaced raceway cover segments, said rearwardly bent end portions further including angled outer ends of J-shape to be received between the inturned flanges of the raceway base, whereby the device bracket can be assembled with the raceway base as a result of deforming the base side walls so as to receive said J-shaped end portions, said device bracket having inwardly spaced top and bottom edges to define slots between the device bracket and the raceway base inturned flanges, and a cover plate having inwardly formed flanges received in said slots, said flanges formed for resiliently deforming said raceway base sidewalls to secure said cover plate between said inturned flanges of said raceway base.

* * * * *

UNITED STATES PATENT AND TRADEMARK OFFICE
CERTIFICATE OF CORRECTION

PATENT NO. : 7,009,108 B2
DATED : March 7, 2006
INVENTOR(S) : Antonio J. Vargas et al.

It is certified that error appears in the above-identified patent and that said Letters Patent is hereby corrected as shown below:

<u>Title page,</u>
Item [57], ABSTRACT,
Line 5, "tap" should read -- top --.

<u>Column 4,</u>
Line 43, delete "." after "bar".
Line 59, delete "aces" and replace with -- cross --.

Signed and Sealed this

Sixth Day of June, 2006

JON W. DUDAS
*Director of the United States Patent and Trademark Office*